(12) United States Patent
Bennett et al.

(10) Patent No.: US 7,813,611 B2
(45) Date of Patent: Oct. 12, 2010

(54) ALUMINUM DOPED OPTICAL FIBER

(75) Inventors: Kevin Wallace Bennett, Hammondsport, NY (US); Joohyun Koh, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/356,169

(22) Filed: Jan. 20, 2009

(65) Prior Publication Data

US 2009/0185781 A1 Jul. 23, 2009

Related U.S. Application Data

(60) Provisional application No. 61/011,781, filed on Jan. 22, 2008.

(51) Int. Cl.
G02B 6/036 (2006.01)
(52) U.S. Cl. .................. 385/128; 385/123; 385/141; 385/142
(58) Field of Classification Search ............. 385/129, 385/123, 128, 141, 142
See application file for complete search history.

(56) References Cited

U.S. PATENT DOCUMENTS

| 4,616,901 | A | 10/1986 | MacChesney et al. ..... 350/96.34 |
| 4,660,928 | A * | 4/1987 | Jaeger et al. ................. 385/142 |
| 4,738,873 | A | 4/1988 | Roba et al. .................. 427/163 |
| 4,770,494 | A * | 9/1988 | Csencsits et al. ............ 385/142 |
| 5,000,541 | A * | 3/1991 | DiMarcello et al. ......... 385/128 |
| 5,259,060 | A * | 11/1993 | Edward et al. .............. 385/128 |
| 6,493,492 | B1 | 12/2002 | Fischer ....................... 385/115 |
| 6,624,925 | B2 | 9/2003 | Hasson et al. ............... 359/333 |
| RE38,298 | E | 11/2003 | Grasso et al. ................. 385/27 |
| 6,847,769 | B1 | 1/2005 | Robinson et al. ............ 385/123 |
| 6,889,528 | B2 | 5/2005 | Sen et al. ...................... 65/390 |
| 7,483,612 | B2 | 1/2009 | Digiovanni et al. ......... 385/123 |
| 2005/0238309 | A1 | 10/2005 | Drenzek et al. ............. 385/128 |
| 2007/0177846 | A1* | 8/2007 | Chen et al. .................. 385/125 |

FOREIGN PATENT DOCUMENTS

| EP | 0182252 | 12/1985 |
| JP | 61040842 | 2/1986 |
| WO | 2009/054745 | 4/2009 |

OTHER PUBLICATIONS

R. Miller et al; "Fiber Optics, Advanced Technologies Complete ERD Producer/Injector", Oil and Gas Journal; Jul. 1999; p. 47-52.

(Continued)

*Primary Examiner*—Charlie Peng
(74) *Attorney, Agent, or Firm*—Svetlana Z. Short

(57) ABSTRACT

According to one example of the invention an optical fiber comprises: (i) a core comprising of Al doped silica having a first index of refraction $n_1$; (ii) at least one silica based cladding surrounding the core and having a second index of refraction $n_2$, such that $n_1 > n_2$; (iii) a hermetic carbon based coating surrounding said cladding, said hermetic coating being 300 nm-1000 nm thick; and (iv) a second coating surrounding said hermetic coating, said second coating being 5 μm to 80 μm thick.

22 Claims, 4 Drawing Sheets

OTHER PUBLICATIONS

J. Simpson et al; "Alternative dopants for silica waveguides", Topical Meeting Optical Fiber Communication; Apr. 13-15, 1982; Digest of Technical Papers (TUCC 5).

K. E. Lu, et al; "Mechanical and hydrogen characteristics of hermetically coated optical fibre", Optical and Quantum Electronics 22, p. 227-237, (1990).

K. E. Lu et al; "Recent developments in hermetically coated optical fibers", Journal of Lightwave Technology; vol. 6, No. 2, Feb. 1988; p. 240-244.

Y. Ohmori, et al; "Transmission loss characteristics of Al2O3-doped silica fibers"; Journal of Lightwave Technology; vol. LT-1; No. 1; Mar. 1983; p. 50-56.

Ohmori et al; "Fabrication of low-loss $Al_2O_3$-doped silica fibres"; Electronics Letters, Sep. 2, 1982; vol. 18, No. 18; p. 761-763.

Simpson et al; "Optical Fibres with an $Al_2O_3$-doped silicate core composition"; Electronics Letters, Mar. 31, 1983; vol. 19; No. 7; p. 261-262.

Kobayashi, et al; "Low-loss optical glass fibre with $Al_2O_3$—$SiO_2$ core"; Electronics Letters, Oct. 3, 1974; vol. 10, No. 20; p. 410-411.

Biswas; "Characterization of polyimide-coated optical fibers"; Optical Engineering, Jun. 1991; vol. 30 No. 6; p. 772-775.

* cited by examiner

ALUMINUM DOPED OPTICAL FIBER

This application claims the benefit of, and priority to U.S. Provisional Patent Application No. 61/011,781 filed on Jan. 22, 2008 entitled, "Aluminum Doped Optical Fiber", the content of which is relied upon and incorporated herein by reference in its entirety.

BACKGROUND OF THE INVENTION

1. Field of the Invention

The present invention relates generally to optical fibers suitable for use in sensing applications in harsh environments.

2. Technical Background

Optical fiber has become a favorite medium for telecommunications due to its high transmission capacity and immunity to electrical noise. Over the past decade, optical fibers have also been used in point and/or distributed sensing applications. Fiber has been used in oil and gas industries to provide critical information for oil exploration, well drilling and production. In these oil/gas wells, optical fibers are used as distributed sensors to monitor/gauge temperature, pressure, and flow information along the depth of geophysical wells. However, the harsh down-hole environment presents a severe reliability challenge. In a typical down-hole environment, optical fiber experiences high temperature (up to 300° C.), high pressure (up to 1000 atm), moisture, hydrogen and other harmful species such as $CO_2$, and $H_2S$.

Specialized fiber coating designs have been developed to protect the optical fibers used in such harsh environments. For example, amorphous carbon-based thin coating (so called "hermetic coating") and metal coatings have been used. However, there has not much work done in the area of the composition of silica glass in the fiber other than using either pure silica core fibers with a Fluorine-doped cladding, or, more typically, fibers with cores consisting of Ge doped silica.

Hermetic coating provides a protective layer which prevents ingress of molecular water or hydrogen into silica glass of the fiber. Hermetic coating also enables highly reliable deployment of the fiber under smaller coil diameters. The presence of hermetic coating provides the optical fiber with improved mechanical integrity. Ge doped fibers have an absorption peak in the visible and near-IR wavelength. Furthermore, our recent studies revealed that applying a hermetic coating onto $GeO_2$-doped fibers completely hinders $H_2$ ingression into fiber core for temperatures up to 150° C., but not above 170° C. For example, elevated attenuation peak at 1240 and 1381 nm and overall elevation of background loss is observed. This indicates that the hermetic layer is no longer genuinely hermetic at temperatures above 170° C. Pure silica core fibers with hermetic coatings also experience loss increase at temperatures above 170° C. and may start having reliability issues at these temperatures.

SUMMARY OF THE INVENTION

The scope of the present invention is determined by the appended claims.

According to one example of the invention an optical fiber comprises: (i) silica based Al doped core having a first index of refraction $n_1$; (ii) at least one silica based cladding surrounding the core and having a second index of refraction $n_2$, such that $n_1 > n_2$; and (iii) a coating surrounding said cladding, said coating being 5 μm to 80 μm thick. Preferably, a hermetic coating is situated between the cladding and the coating that surrounds the cladding. In some embodiments the optical fiber has a single mode core. In some other embodiments the optical fiber has a multimode core.

Some of the advantages the optical fibers disclosed herein are: high reliability at temperatures above 170° C. These fibers also can be used in other harsh environments, in sensing applications that utilize Ge doped fibers, or pure silica core fibers. One of the advantages of the optical fiber according to the embodiments of the present invention is much less $H_2$ aging around 1064 nm wavelength. It is noted that the wavelength range of 1064 nm is the main operating window in Distributed Temperature Sensing (DTS) application for gas/oil sensing applications.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
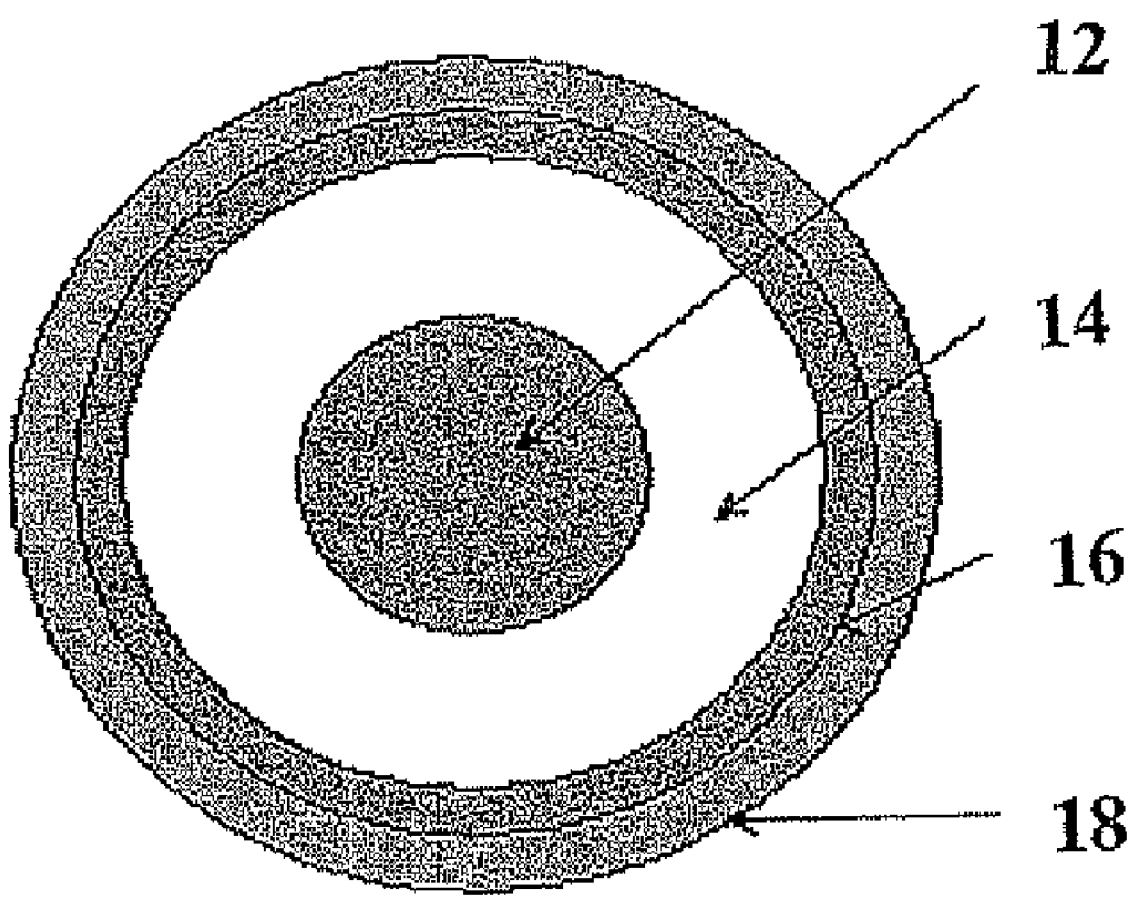
FIG. 1 is a schematic cross-sectional view of one embodiment of the present invention.

Reference will now be made in detail to the present preferred embodiments of the invention, examples of which are illustrated in the accompanying drawings. Whenever possible, the same reference numerals will be used throughout the drawings to refer to the same or like parts. One embodiment of optical fiber in accordance with the present invention is shown schematically in FIG. 1, and is designated generally throughout by the reference numeral 10. The optical fiber 10 illustrated in FIG. 1 includes: a silica based, Al doped core 12 having a first index of refraction $n_1$; a at least one silica based cladding 14 surrounding the core and having a second index of refraction $n_2$, such that $n_1 > n_2$; a hermetic coating 16 (e.g., carbon coating) surrounding the cladding 14 and a second, or outer coating 18 surrounding the hermetic coating 16. The second, or outer coating 18 may be made, for example, with metals (e.g., Cu or Au coatings), acrylate, silicone, or polyimide materials, depending on application and operating temperature. It may be 5 μm to 80 μm thick (for example 10 μm, 15 μm, 20 μm, 30 μm, 40 μm, 50 μm, 50 μm or 70 μm thick). For example, acrylate coatings work well in temperatures of up to about 120° C., silicon coatings in temperatures of up to about 175° C., polyimide coatings in temperatures of up to about 500° C., and Cu and Au in temperatures of up to about 1000° C. Thus the described dual coating structure provides extra protection against $H_2$ aging and high temperature. It is noted that the presence of hermetic coating is preferred, but is not necessary in some applications. In these applications the fiber will comprise the core 12, cladding 14 and coating 18.

In some embodiments the silica based core 12 consists essentially of Al doped silica. The core has no active dopants such as Er or Yb. The optical fiber core 12 may be either circular, or elliptical (not shown). It is preferable that the core inner cladding 14 has a relative refractive index delta (relative to that of the cladding) of about 0.2% Δ to about 2.05% Δ. The numerical aperture NA of core is defined as $(n_1^2 - n_2^2)^{1/2}$. The core preferably has numerical aperture NA between 0.09 and 0.30 and more preferably between 0.12 and 0.2.

The core 12 may be either a single mode core, or a multi mode core. It is preferable that the core includes about 4 to about 24 wt % $Al_2O_3$ (the rest silica), and that the cladding consists essentially of either pure silica, or F doped silica, such that F content of the cladding is between 0 and 5 wt %. Preferably, a hermetic carbon based coating 16 surrounding is 300 nm-1000 nm thick; and the second coating 18 surrounding the hermetic coating is 5 μm to 80 μm thick. If fluorine (F) is utilized, it is preferable to have more than 1 wt % and more preferably more than 2 wt % of F.

EXAMPLES

The invention will be further clarified by the following examples.

Example 1

Figure 2:
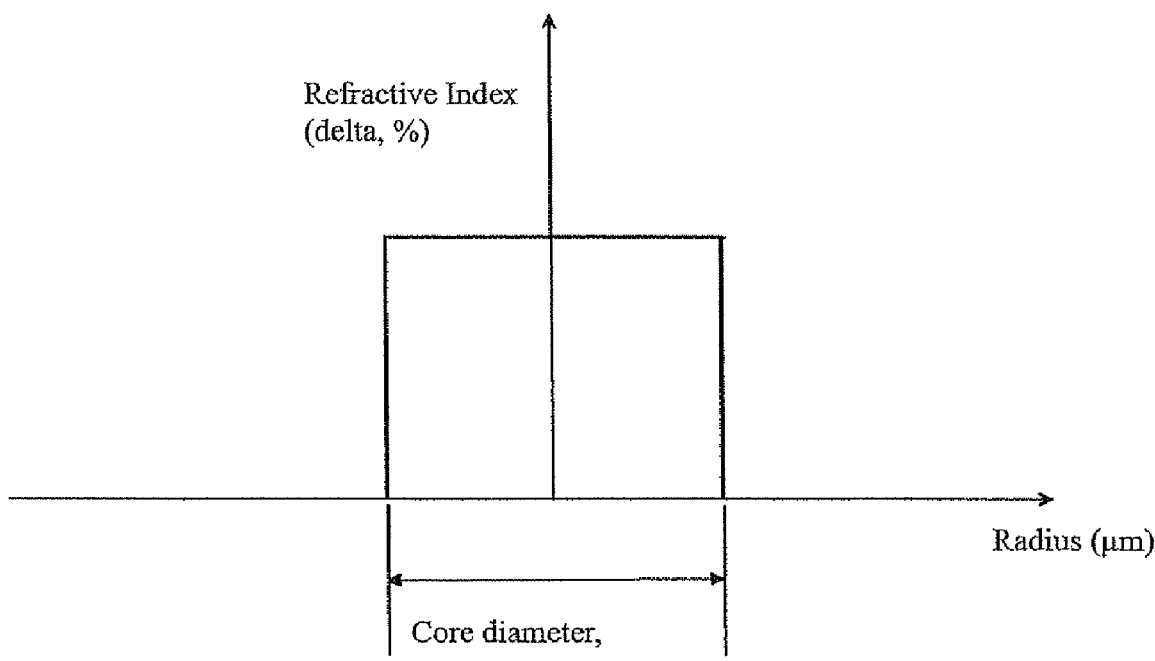
FIG. 2 is a refractive index profile of a first example of optical fiber in accordance with the present invention.

FIG. 2 illustrates a refractive index profile (core and cladding) of a first exemplary optical fiber of the present invention. This optical fiber has the cross-section illustrated in FIG. 1. More specifically, FIG. 2 depicts this optical fiber's refractive index percent delta (relative to that of the cladding) vs. the distance (radius) measured from the core center. The refractive index percent delta is defined herein as $(n_1^2 - n_2^2)/2n_2^2$.

This modeled optical fiber has an Al doped core 12, and a silica cladding 14. The Al doped core of this example has a very well defined step index, because no or very little diffusion of Al into the cladding. That is, the low mobility of the Al ions in silica glass makes it a superior dopant for index profile control as compared to Ge-doped fiber. FIG. 2 shows that the relative refractive index difference (percent delta) of the core 12 is about 0.38, and core NA is about 0.13. In this example, the Al-doped (5 wt % of $Al_2O_3$) fiber core 12 is single-mode for the wavelengths above 1290 nm. The single mode core is preferably 5 μm to 12 μm in diameter, and in this example is 8 μm. If the core NA is higher (0.20, for example), the core diameter would have to be smaller (about 5 microns, for example) in order to be single mode. The bigger core diameter and lower core NA allows the core 12 to stay single-mode.

The fiber of FIG. 2 can be produced by the outside-vapor-deposition process (OVD). The OVD process is a way of making optical fiber by depositing from the desired vapor ingredients (including silica and the desired dopants) reacting with oxygen in a flame to form the soot-particles on a bait rod, for making fiber soot-preform. The soot-preform is then consolidated into solid transparent glass in a high temperature furnace, after the bait rod is removed. The core/cladding compositions are achieved by utilizing different vapor-ingredients for each of the layers in the soot preform forming process. The core/cladding soot performs is generated first, is then consolidated into the final preform. The final preform is then drawn into optical fiber 10 by known fiber-drawing methods.

The specific composition for the optical fiber of the first example is:
Core 12: $SiO_2$ with 5 wt % $Al_2O_3$;
Cladding 14: Pure Silica;
Hermetic coating 16: carbon
Second coating 18: Polyimide Example 2

Figure 3:
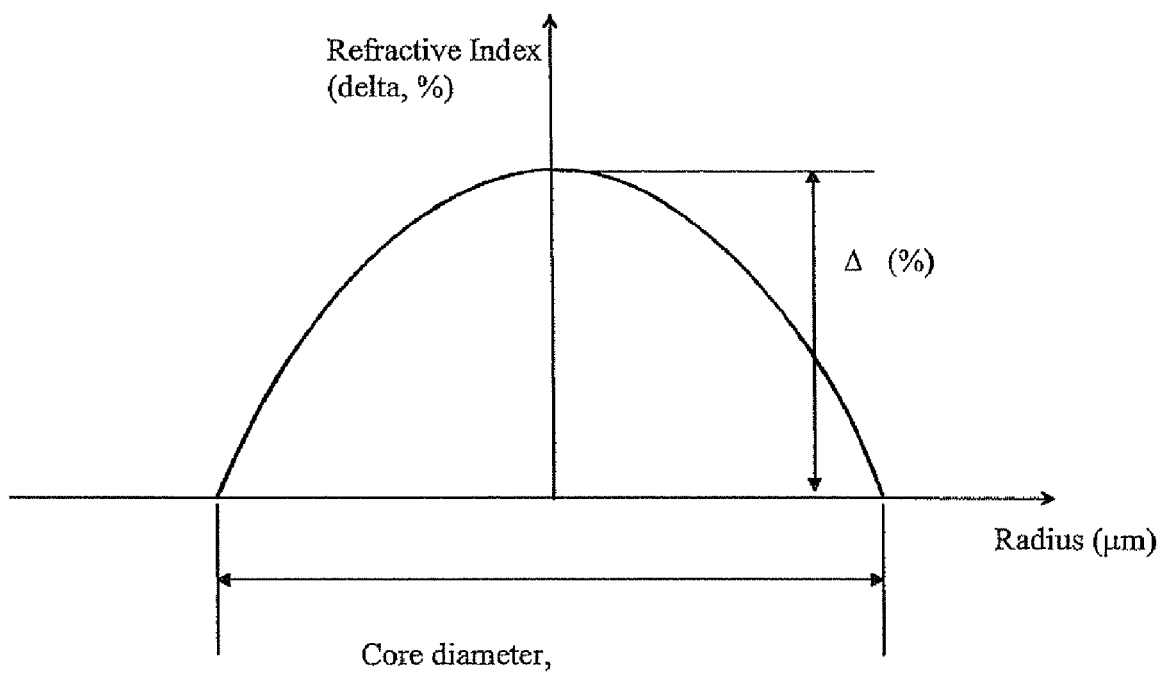
FIG. 3 is a refractive index profile of a second example of optical fiber in accordance with the present invention.

FIG. 3 illustrates a refractive index profile (core and cladding) of a second exemplary optical fiber of the present invention. This optical fiber has the cross-section illustrated in FIG. 1. FIG. 3 depicts this optical fiber's refractive index percent delta (relative to that of the cladding) vs. the distance measured from the core center. This modeled optical fiber has an Al doped multi mode core 12, and a silica cladding 14. The Al doped multi mode core of this example has a graded index. It is noted that the precise amount of Al dopant at different core locations is easier to control than the amount of Ge in Ge doped fibers. That is, the low mobility of the Al ions in silica glass makes it a superior dopant for index profile control as compared to Ge-doped fiber. It is noted that the addition of Al dopant allows for graded index multi-mode profiles where pure silica core fiber can only be made as a step-index fiber. The graded Index profile may be critical to high bandwidth in multi-mode fibers and enables long length, high resolution measurements.

FIG. 3 shows that the relative refractive index difference (percent delta) of the core 12 is about 1.0. In this example, the Al-doped (12 wt % of $Al_2O_3$) fiber core 12 is multi-moded. The multi mode core is preferably 35 μm to 65 μm in diameter, and in this example is 50 μm, and the cladding outer diameter is 125 μm.

The fiber of FIG. 3 can also be produced by the outside-vapor-deposition process (OVD). The OVD process is a way of making optical fiber by depositing from the desired vapor ingredients (including silica and the desired dopants) reacting with oxygen in a flame to form the soot-particles on a bait rod, for making fiber soot-preform. The soot-preform is then consolidated into solid transparent glass in a high temperature furnace, after the bait rod is removed. The core/cladding compositions are achieved by utilizing different vapor-ingredients for each of the layers in the soot preform forming process. The core/cladding soot performs is generated first, is then consolidated into the final preform. The final preform is then drawn into optical fiber 10 by known fiber-drawing methods.

The specific composition for the optical fiber of the second example is:
Core 12: $SiO_2$ with 12 wt % $Al_2O_3$;
Cladding 14: pure silica
Hermetic coating 16: carbon
Second coating 18: polyimide.
A Distributed Temperature Sensing (DTS) is a technology which provides a technique to measure the temperature distribution along a fiber optic line. The fiber optic length can be any length up to about 30 km. It is inherently safe to use in environments where electrical spark may pose a fire safety hazard. Therefore, DTS uniquely suited as a monitoring technique in oil and gas applications. Graded index Ge doped multi-mode fiber (50 μm core and 125 μm clad diameter) is presently the most commonly used in DTS. (Due to small core diameter, small angle of acceptance, and very small backscattered energy of single-mode fiber, single-mode fiber is typically not used in DTS applications, but may be used in other applications.) Typically a Raman signal is used for evaluation of temperature in DTS system. It is sufficiently strong and has unique temperature dependence. The Raman signal includes the "Stokes" and "anti-Stokes" bands. The Stokes band at the higher wavelength (red shifted) is stable with little temperature change. The anti-Stokes band at the lower wavelength (blue shifted) exhibits a temperature sensitivity, where the higher the energy within the band, the higher the temperature. A ratio of the energy or area within the anti-Stokes band to that of the Stokes band can be related to the temperature of the fiber optic line at the depth where the signal originated. A 1064 nm laser is widely used as light source in DTS system. In this case, the Raman backscattered signals will be located in a spectral range centered about 1064 nm (about ±40 nm), such as 1024 nm and 1104 nm. Therefore, optical fiber should be robust in this wavelength range against $H_2$ aging, in order to provide reliability to the DTS system. The multimode Al doped core fiber according to the embodiments of the present invention are uniquely suitable for use in DTS systems because they are more robust than the Ge doped fibers in the wavelength range of interest (i.e., 1000 nm to 1200 nm).

Analysis

Figure 4:
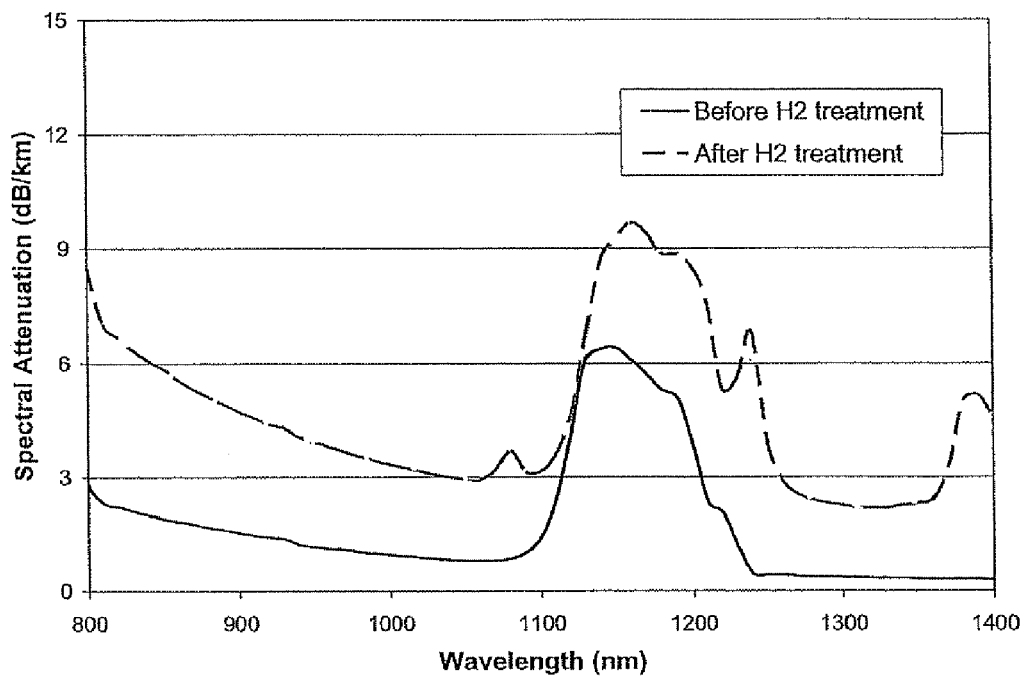
FIG. 4 is a graph of spectral attenuation of a manufactured $GeO_2$-doped single-mode fiber measured before (solid line) and after (dashed line) $H_2$/high temperature aging test.
Figure 5:
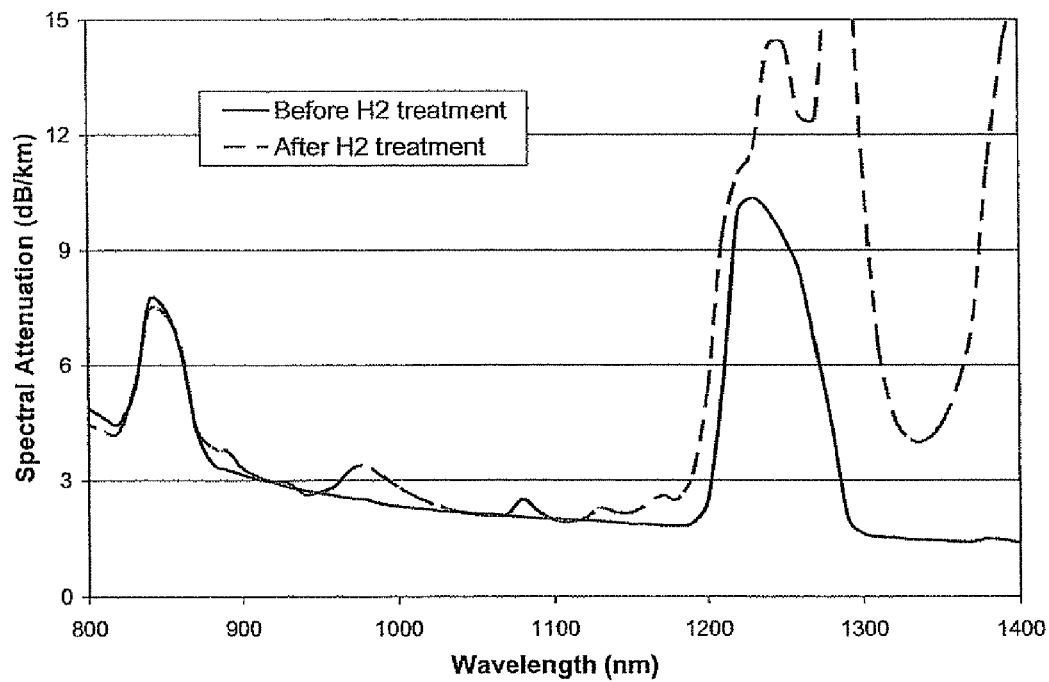
FIG. 5 is a graph of spectral attenuation of a manufactured $Al_2O_3$-doped single-mode fiber according to one embodiment of the present invention, measured before (solid line) and after (dotted line) $H_2$/high temperature aging test.

FIGS. 4 and 5 shows spectral attenuation measured before and after $H_2$/high temperature aging test for manufactured Ge-doped SM fiber (FIG. 4), and Al-doped SM fiber (FIG. 5). It should be noted that all fibers were coated only by acrylate coating (no hermetic). This coating system clearly demonstrates $H_2$ aging effect from glass composition, not from coatings. All fibers were aged (treated) at 150° C. in 100% 1 atm $H_2$ for 170 hours. It should be noted that big bump around 1200 nm in all fibers corresponds to a higher order mode cutoff.

FIG. 4 illustrates spectral attenuation of a manufactured single mode optical fiber with Ge doped core. (Before treatment results are indicated by solid lines, after treatment (i.e., after aging results), by dashed lines.) FIG. 4 illustrates that the Ge-doped fiber exhibits both reversible and non-reversible $H_2$ aging features. Sign of interstitial $H_2$ molecular overtone absorption appears at 1240 nm and seen significant increase of IR loss edge. Irreversible process of $H_2$ reaction in glass network, such as hydroxyl formation appears at 1381 nm (Si—OH bond), 1410 nm (Ge—OH bond), and significant absorption tail in UV range (Ge—H bond)

FIG. 5 illustrates spectral attenuation of a manufactured single mode optical fiber with Al doped core that has a refractive index profile similar to that shown in FIG. 2. (Before treatment results are indicated by solid lines, after treatment results, by dashed lines.) FIG. 5 illustrates that significant peaks at 1240 nm and 1380 nm are also present for this manufactured single mode Al-doped fiber. However, $H_2$ aging effect around 1064 nm of this Al doped fiber is very small compared to that of Ge-doped fiber of FIG. 4. This is an advantageous characteristic of Al-doped single mode fiber when used in DTS applications.

Figure 6:
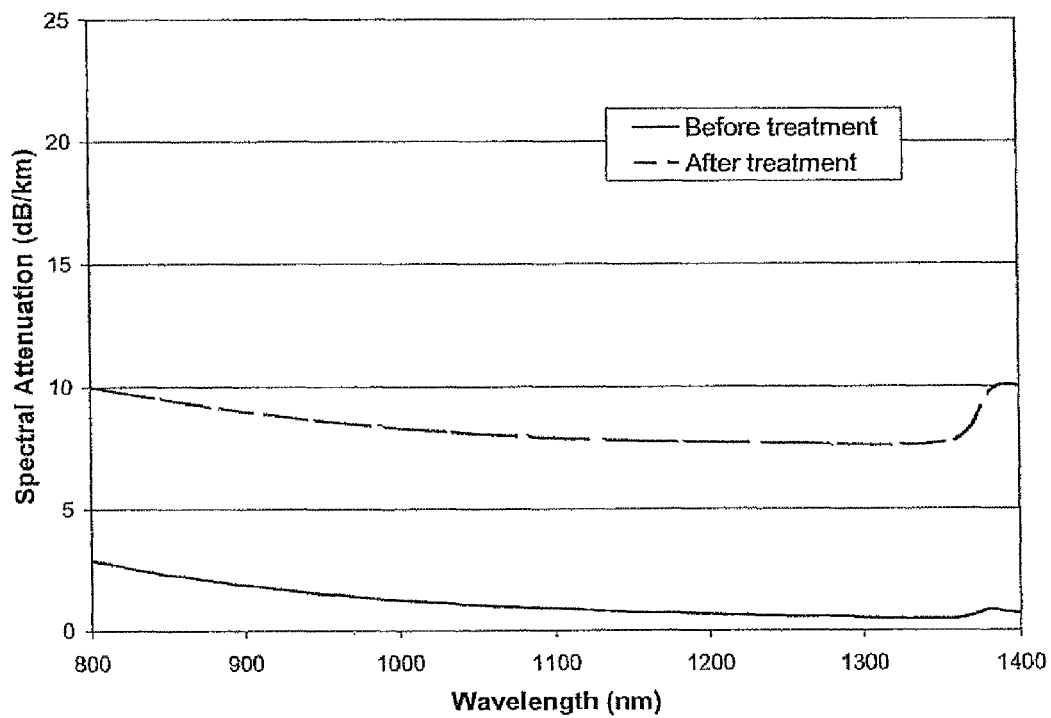
FIG. 6 is a graph of spectral attenuation of a manufactured $GeO_2$-doped multi-mode fiber measured before (solid line) and after (dashed line) $H_2$/high temperature aging test.

FIG. 6 illustrates spectral attenuation of a manufactured multi mode optical fiber with Ge doped core. (Before treatment results are indicated by solid lines, after treatment (i.e., after aging) results, by dashed lines.) FIG. 6 shows that the manufactured Ge-doped multi mode fiber exhibits both reversible and non-reversible $H_2$ aging features which elevates attenuation in wavelength from 800 nm to 1400 nm.

Figure 7:
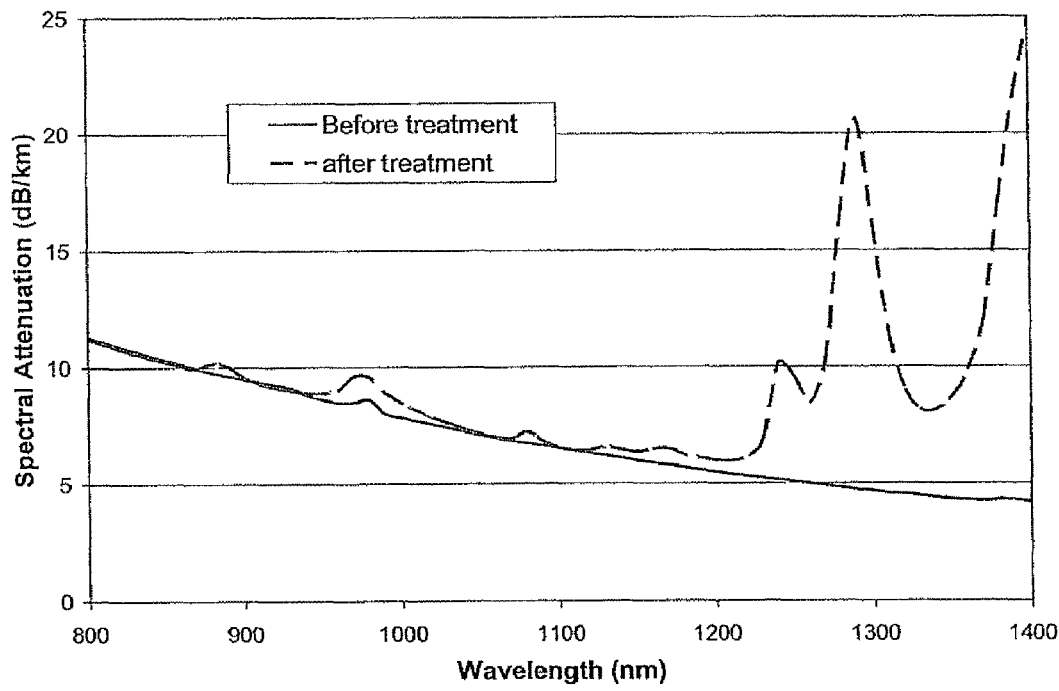
FIG. 7 is a graph of spectral attenuation of a manufactured $Al_2O_3$-doped multi-mode fiber according to one embodiment of the present invention, measured before (solid line) and after (dotted line) $H_2$/high temperature aging test.

FIG. 7 illustrates spectral attenuation of a manufactured multi mode optical fiber with Al doped core that has a refractive index profile similar to that shown in FIG. 3. (Before treatment results are indicated by solid lines, after treatment (i.e., after aging) results, by dashed lines.) FIG. 7 illustrates that significant peaks at 1240 nm, 1280 nm, and 1380 nm are present for Al-doped multi mode fiber similar with refractive index profiles similar to that shown in FIG. 3. However, $H_2$ aging effect around 1064 nm is very small compared to Ge-doped multi mode fiber shown in FIG. 6. Thus, it is advantageous to use Al-doped multi mode fiber for DTS applications.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical fiber comprising:
   (i) a circular core comprising Al doped silica having a first index of refraction $n_1$, but no Er or Yb;
   (ii) at least one silica based cladding surrounding the core and having a second index of refraction $n_2$, such that $n_1 > n_2$;
   (iii) a hermetic carbon based coating surrounding said cladding, said hermetic coating being 300 nm to 1000 nm thick; and
   (iv) a second coating surrounding said hermetic coating, said second coating being 5 μm to 80 μm thick, wherein when said fiber is treated at 150° C. in 100% 1 atm $H_2$ for 170 hours, the attenuation change in 950 nm to 1150 nm wavelength band is less than 1.5 dB/km.

2. The optical fiber according to claim 1 wherein said second coating is selected from a group comprising: acrylate(s), silicone(s), polyimide(s), metal(s).

3. The optical fiber according to claim 1, wherein said cladding comprises of Si and 0-5 wt % F.

4. The optical fiber according to claim 1 wherein said second coating is selected from a group consisting essentially of: acrylate(s), silicone(s), polyimide(s), metal(s) and said cladding consists of Si and 0-5 wt % F.

5. The optical fiber according to claim 2 wherein said core is a single mode core with a relative index delta with respect to said cladding between 0.2% and 2.05%, and a core diameter of 5 to 12 μm.

6. The optical fiber according to claim 5 wherein said core includes 4-24 wt % Al.

7. The optical fiber according to claim 5 wherein said core is a step index core.

8. The optical fiber according to claim 2 wherein said core is a multi mode core with a relative index delta with respect to said cladding between 0.5% and 2.05%, and a core diameter of 35 to 65 μm.

9. The optical fiber according to claim 8, wherein said core is a graded index core.

10. The optical fiber according to claim 8, wherein said core includes 5.5 to 24 wt % Al.

11. The optical fiber according to claim 8, wherein said cladding consists essentially of Si and 0-5 wt % F.

12. The optical fiber according to claim 1, wherein said core consists of Al doped silica.

13. An optical fiber comprising:
(ii) a core comprising Al doped silica having a first index of refraction $n_1$, said core including no significant amounts of active dopants;
(ii) at least one silica based cladding surrounding the core and having a second index of refraction $n_2$, such that $n_1 > n_2$;
(iii) a hermetic carbon based coating surrounding said cladding, said hermetic coating being 300 nm to 1000 nm thick; and
(iv) a second coating surrounding said hermetic coating, said second coating being 5 μm to 80 μm thick.

14. The optical fiber according to claim 13 wherein said at second coating is selected from a group consisting essentially of: acrylate(s), silicone(s), polyimide(s), metal(s).

15. The optical fiber according to claim 13, wherein said cladding consists essentially of Si and 0-5 wt % F.

16. The optical fiber according to claim 13 wherein said core includes 4-24 wt % Al.

17. The optical fiber according to claim 13, wherein said core consists of Al doped silica.

18. An optical fiber comprising:
(i) a core consisting essentially of Al doped silica having a first index of refraction $n_1$;
(ii) at least one silica based cladding surrounding the core and having a second index of refraction $n_2$, such that $n_1 > n_2$;
(iii) a hermetic carbon based coating surrounding said cladding, said hermetic coating being 300 nm to 1000 nm thick; and
(iv) a second coating surrounding said hermetic coating, said second coating being 5 μm to 80 μm thick.

19. The optical fiber according to claim 18 wherein said second coating is selected from a group consisting essentially of: acrylate(s), silicone(s), polyimide(s), metal(s).

20. The optical fiber according to claim 18, wherein said cladding consists essentially of Si and 0-5 wt % F.

21. The optical fiber according to claim 18, wherein said second coating is selected from a group consisting essentially of: acrylate(s), silicone(s), polyimide(s), metal(s) and said cladding consists essentially of Si and 0-5 wt % F; and
wherein: (i) said core is a single mode core with a relative index delta with respect to said cladding between 0.2% and 2.05%, and a core diameter of 5 to 12 μm, and said core includes 4-24 wt % Al; or
(ii) said core is a multi mode core with a relative index delta with respect to said cladding between 0.5% and 2.05%, and a core diameter of 35 to 65 μm.

22. The optical fiber according to claim 13, said core not having Ge, Er or Yb.

* * * * *